United States Patent
Ross et al.

(10) Patent No.: US 12,443,705 B2
(45) Date of Patent: Oct. 14, 2025

(54) METHOD FOR MONITORING A COMPONENT OF AN EVENT CHAIN

(71) Applicant: Robert Bosch GmbH, Stuttgart (DE)

(72) Inventors: Hans-Leo Ross, Lorsch (DE); Lucas Heil, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 210 days.

(21) Appl. No.: 17/823,328

(22) Filed: Aug. 30, 2022

(65) Prior Publication Data
US 2023/0071630 A1 Mar. 9, 2023

(30) Foreign Application Priority Data
Sep. 3, 2021 (DE) .............. 10 2021 209 691.3

(51) Int. Cl.
*H04L 29/06* (2006.01)
*G06F 21/33* (2013.01)
(Continued)

(52) U.S. Cl.
CPC ............ *G06F 21/554* (2013.01); *G06F 21/33* (2013.01); *B60W 50/0098* (2013.01); *G06F 2221/034* (2013.01)

(58) Field of Classification Search
CPC .. G06F 21/554; G06F 21/33; G06F 2221/034; G06F 11/0796; G06F 11/1633; G06F 21/57; G06F 21/74; G06F 21/64; G06F 21/00; G06F 2221/00; G06F 2221/2113; G06F 9/542; G06F 2201/86; B60W 50/0098; G05B 2219/24125; G05B 2219/25158; G05B 2219/31038; G05B 2219/33242; G05B 2219/34466;
(Continued)

(56) References Cited

U.S. PATENT DOCUMENTS

2002/0099955 A1  7/2002  Peled et al.
2012/0246463 A1* 9/2012 Shea ................... H04L 63/0428
                                                        713/153
(Continued)

FOREIGN PATENT DOCUMENTS

DE  102015119031 A1  5/2017
DE  112017001853 T5  12/2018
(Continued)

*Primary Examiner* — Joseph P Hirl
*Assistant Examiner* — Leynna Truvan
(74) *Attorney, Agent, or Firm* — NORTON ROSE FULBRIGHT US LLP

(57) ABSTRACT

A method for monitoring a component of an event chain for an at least semi-automated driving function of a motor vehicle using a watchdog in which an enclave is implemented. The method includes: generating a first certificate for the component of the event chain with the aid of the first enclave, outputting the first certificate to the component with the aid of the watchdog, receiving output data output by the component with the aid of the watchdog, checking the output data on the basis of the first certificate with the aid of the first enclave in order to output a first check result, triggering a security action with the aid of the watchdog based on the first check result. A device, a computer program, and a machine-readable memory medium are also provided.

16 Claims, 2 Drawing Sheets

(51) Int. Cl.
*G06F 21/55* (2013.01)
*B60W 50/00* (2006.01)

(58) Field of Classification Search
CPC ........... G05B 2219/42308; G05B 2219/31006; G05B 2219/39173; G05B 2219/25413; G05B 2219/42006; G05D 1/619; G03H 1/0011; G09F 3/03; G01C 7/04; G01C 21/3626; G01S 2013/932; G08G 1/096708; G08G 1/096725; G08G 1/162; H04L 9/3263; H04L 9/3265; H04L 9/3268; H04L 45/028; H04L 9/00; H04L 9/0877; H04L 12/40104; H04L 63/107; H01H 85/0078; H01Q 1/3233; H02P 1/022; H03K 19/17768; H04T 2001/221; H04W 12/00; H04W 12/08; H04W 12/30; H04W 12/60; H04W 36/0038; H04W 48/00; H05K 1/0275; H04M 15/8278; H04M 2215/788
See application file for complete search history.

(56) References Cited

U.S. PATENT DOCUMENTS

2018/0183580 A1\* 6/2018 Scarlata .................. G06F 21/53
2020/0344622 A1\* 10/2020 Campbell, Jr. ..... H04L 43/0805
2020/0366702 A1 11/2020 Mahaffey et al.

FOREIGN PATENT DOCUMENTS

| DE | 112016006867 T5 | 2/2019 |
| DE | 102019214413 A1 | 3/2021 |
| DE | 102020122712 A1 | 3/2021 |
| WO | 2017198291 A1 | 11/2017 |
| WO | 2017210145 A1 | 12/2017 |

\* cited by examiner

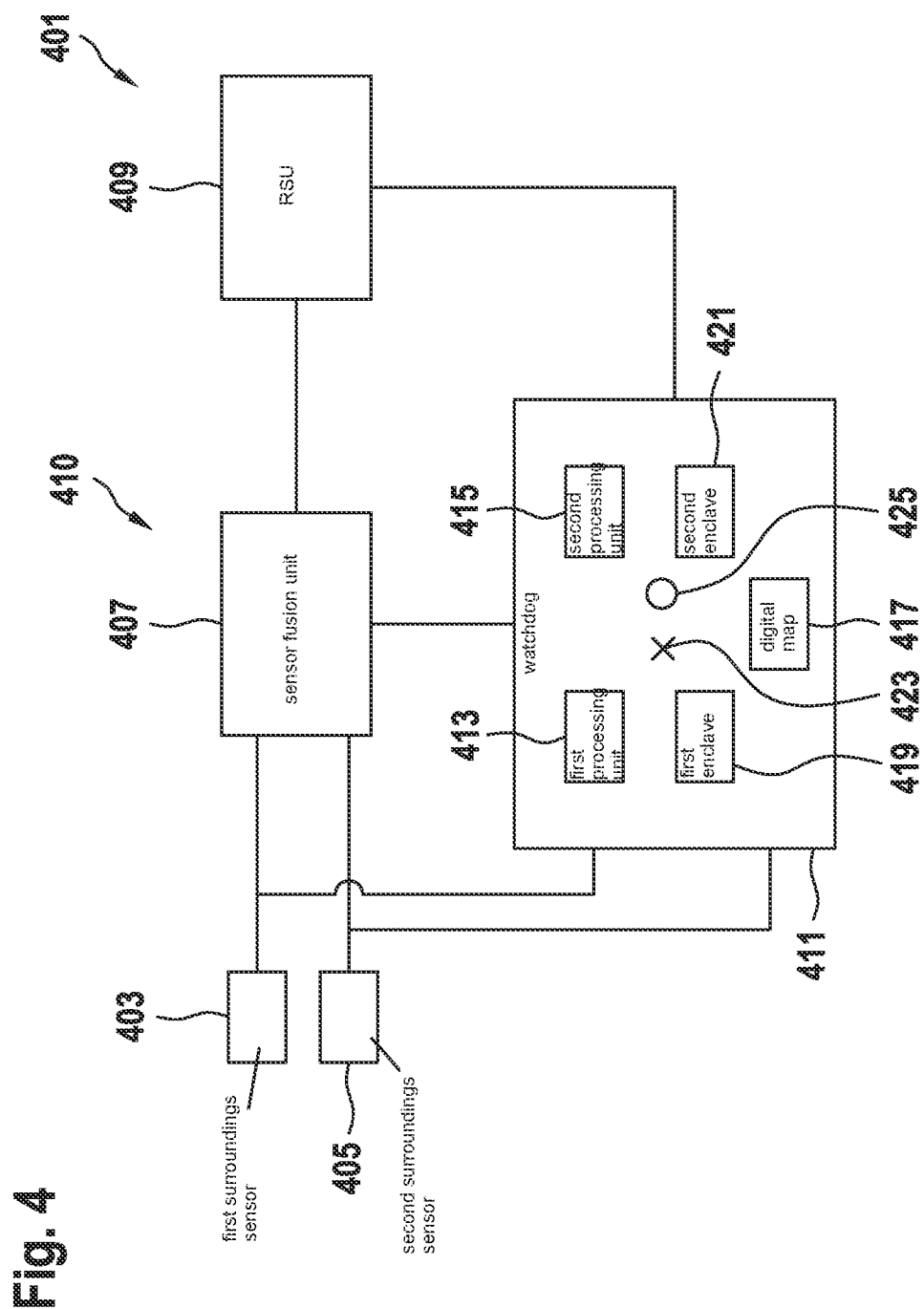

METHOD FOR MONITORING A COMPONENT OF AN EVENT CHAIN

FIELD

The present invention relates to a method for monitoring a component of an event chain for an at least semi-automated driving function of a motor vehicle, to a device, to a computer program, and to a machine-readable memory medium.

BACKGROUND INFORMATION

German Patent Application No. DE 10 2015 119 031 A1 describes a method for transferring at least one transfer value from a first program to a second program.

German Patent Application No. DE 11 2016 006 867 T5 of the international PCT Application No. WO 2017/198291 describes a peer-to-peer network.

German Patent Application No. DE 11 2017 001 853 T5 of the international PCT Application No. WO 2017/210145 describes a method for providing confirmation keys in secure enclaves.

SUMMARY

An object underlying the present invention includes providing efficient monitoring of a component of an event chain for an at least semi-automated driving function of a motor vehicle.

This object may be achieved with the aid of features of the present invention. Advantageous example embodiments of the present invention are disclosed herein.

According to one first aspect of the present invention, a method is provided for monitoring a component of an event chain for an at least semi-automated driving function of a motor vehicle using a watchdog, in which an enclave is implemented. According to an example embodiment of the present invention, the method includes the following steps:
  generating a first certificate for the component of the event chain with the aid of the first enclave,
  outputting the first certificate to the component with the aid of the watchdog,
  receiving output data output by the component with the aid of the watchdog,
  checking the output data on the basis of the first certificate with the aid of the first enclave in order to output a first check result,
  triggering a safety action with the aid of the watchdog based on the first check result.

According to one second aspect of the present invention, a device is provided, which is configured to carry out the steps of the method according to the first aspect.

According to one third aspect of the present invention, a computer program is provided, which includes commands which, when the computer program is executed by a computer, for example, by the device according to the second aspect, prompt the computer to carry out the method according to the first aspect.

According to one fourth aspect of the present invention, a machine-readable memory medium is provided, on which the computer program according to the third aspect is stored.

The present invention is based on and includes the finding that the above object may be achieved by the component of the event chain being monitored with the aid of a watchdog, in which an enclave is implemented. Steps, which are carried out within the enclave, i.e., with the aid of the enclave, are particularly trustworthy. This means that the corresponding results may be trusted. The corresponding results thus exhibit a high degree of trustworthiness. This is explained, in particular, by the fact that an enclave is an area within an address space of a process, the area being protected specifically by a CPU, i.e., by a processor, for the area all direct accesses, even by privileged processes, being controlled and/or prevented by the CPU. This specific protection of the area includes, for example, a transparent memory encryption, in particular, with integrity protection. In addition to the classical tasks of the enclave, this memory encryption according to the concept described here is able to ensure, in particular, also the correctness of a function, of a process and/or of a sequential sequence and/or temporal sequence in a verifiable manner. If, for example, this is no longer able to be established by the enclave, then the enclave, for example, no longer triggers the watchdog, which results in a triggering of the security action by the watchdog.

This means that certificates that are generated by the enclave are generally not able to be manipulated by harmful software. As a result, a function intended to execute and/or to provide the component may be efficiently cryptographically safeguarded, for example, based on the first certificate. Thus, it may be established, for example, with the aid of the watchdog in the output data, whether the output data have been manipulated, so that if this is the case, for example, a security action may be triggered with the aid of the watchdog.

Thus, for example, manipulations at the component and/or at the output data are efficiently detectable, so that ultimately the component of the event chain for the at least semi-automated driving function may be efficiently monitored.

In one specific example embodiment of the present invention, the event chain is implemented in an infrastructure. This yields, for example, the technical advantage that the event chain is able to be efficiently implemented.

In one specific example embodiment of the present invention, it is provided that the event chain is implemented in the motor vehicle. This yields, for example, the technical advantage that the event chain is able to be efficiently implemented.

In one specific example embodiment of the present invention, the event chain is implemented partially in an infrastructure and is implemented partially in the motor vehicle. This yields, for example, the technical advantage that the event chain is able to be efficiently implemented.

In one specific example embodiment of the present invention, a component within the context of the description is an on-board component or is a component inherent to the infrastructure. This means, therefore, that a component may be part of the motor vehicle or part of the infrastructure. Thus, this means, in particular, that the component may be encompassed by the motor vehicle or by the infrastructure.

Since an enclave within the context of the description is able to carry out, in particular, secure actions, the enclave may also be referred to as a secure enclave.

In one specific example embodiment of the present invention, the watchdog is implemented in hardware and/or in software. In one specific embodiment, the enclave is implemented in software and/or in hardware.

This yields, for example, the technical advantage that the watchdog and/or the enclave is/are able to be efficiently implemented.

For example, an enclave will be implemented based on the programming reference Intel® Software Guard Extension (SGX) or ARM® Trust Zone.

In one specific example embodiment of the present invention, the method according to the first aspect includes an implementation of the first enclave in the watchdog.

A watchdog within the context of the description refers to a function for failure recognition and/or for the recognition and/or for the detection of a malfunction.

In one specific example embodiment of the present invention, it is provided that the check includes whether the output data include the first certificate and/or a component certificate, which has been generated using the first certificate, so that the first check result indicates what kind of certificate is contained in the output data.

This may yield, for example, the technical advantage that the output data are able to be efficiently checked.

According to one specific example embodiment of the present invention, it is provided that the check includes whether the output data have been received within a predetermined time interval after outputting the first certificate, so that the first check result indicates whether the output data have been received within a predefined time interval after outputting the first certificate.

This may yield, for example, the technical advantage that the check is able to be efficiently carried out.

For example, it is provided that if the first check result indicates that the output data include the first certificate and/or a component certificate, which has been generated using the first certificate, the security action is not triggered, i.e., no security action is triggered. Otherwise, it is provided that the security action is triggered.

For example, it is provided that no security action is triggered if the first check result indicates that the output data have been received within the predetermined time interval after outputting the first certificate. Otherwise, it is provided, for example, that a security action is triggered.

In one specific example embodiment of the present invention, it is provided that the first certificate is linked to a time specification with the aid of the watchdog in order to cryptographically protect the time specification, so that the correspondingly cryptographically protected time specification is output to the component.

This may yield, for example, the technical advantage that the component is able to use a cryptographically protected time specification.

According to one specific embodiment of the present invention, it is provided that in the watchdog a second enclave is implemented, the first certificate and the output data being output to the second enclave, so that based on the first certificate the output data are checked with the aid of the second enclave in order to output a second check result, the security action being triggered based on the second check result.

This may yield, for example, the technical advantage that a redundancy may be efficiently effectuated by the second enclave. The second enclave is thus able to efficiently monitor the first enclave.

Statements made in connection with the first enclave apply similarly to the second enclave and vice versa.

For example, it is provided that a second certificate for the component of the event chain is generated with the aid of the second enclave. The second certificate, for example, is output to the component with the aid of the watchdog. For example, the second certificate is output to the first enclave, so that the output data are checked with the aid of the first enclave based on the second certificate in order to output the first check result. Thus, for example, the two enclaves are able to efficiently monitor one another in a reciprocal manner, so that, for example, systematic and/or random errors may be managed.

According to one specific example embodiment of the present invention, it is provided that the security action is an element selected from the following group of security actions: rejection of the output data, rejection of an output data flow of the component, rejection of a data packet including the output data, rejection of the component as a source of pieces of information.

This may yield, for example, the technical advantage that particularly suitable security actions are able to be provided.

When the singular is used for the security function, then the plural is always to be implied and vice versa. This means, in particular, that, for example, multiple security actions may be triggered.

According to one specific example embodiment of the present invention, it is provided that the component is an element selected from the following group of components: sensor, RSU, ICU, VCU, actuator, surroundings sensor, main control unit, actuator control unit, processor, communication interface, actuator sensor, memory medium, transfer medium, data processor.

This yields, for example, the technical advantage that particularly important components of the event chain are able to be monitored.

"ICU" is an abbreviation for the English language term "Instruction Cache Unit." "Instruction Cache Unit" may be translated into German as "Befehlscache-Einheit." An instruction cache unit is, for example, a specific cache memory for buffering instructions.

"VCU" is an abbreviation for the English language term "Vehicle Control Unit." "Vehicle Control Unit" may be translated into German as "Kraftfahrzeug-Steuergerät."

"RSU" is an abbreviation for "Roadside Unit". The term "Roadside Unit" may be translated into German as "straßenseitige Einheit" or as "straßenseitige Infrastruktureinheit." Instead of "RSU," the following terms may be used synonymously: roadside unit, roadside infrastructure unit, communication module, roadside communication module, roadside radio unit, roadside transmitting station.

According to one specific example embodiment of the present invention, it is provided that the method according to the first aspect is a computer-implemented method.

An at least semi-automated driving function is able to drive the motor vehicle at least in a semi-automated manner.

The wording "at least semi-automated driving" includes one or multiple of the following cases: assisted driving, semi-automated driving, highly automated driving, fully automated driving. The wording "at least semi-automated" therefore includes one or multiple of the following wordings: assisted, semi-automated, highly automated, fully automated.

Assisted driving means that a driver of the motor vehicle continually carries out either the transverse guidance or the longitudinal guidance of the motor vehicle. The respectively other driving task (i.e., a controlling of the longitudinal guidance or of the transverse guidance of the motor vehicle) is carried out automatically. This means, therefore, that during an assisted driving of the motor vehicle either the transverse guidance or the longitudinal guidance is controlled automatically.

Semi-automated driving means that in a specific situation (for example: driving on an expressway, driving within a parking facility, passing an object, driving within a traffic lane, which is defined by traffic lane markings) and/or for a certain period of time, a longitudinal guidance and a transverse guidance of the motor vehicle are controlled automatically. A driver of the motor vehicle him/herself does not have to manually control the longitudinal guidance and transverse guidance of the motor vehicle. However, the driver must continually monitor the automatic control of the longitudinal guidance and transverse guidance in order to be able to manually intervene if needed. The driver must be prepared to take full driving control of the motor vehicle at any time.

Highly automated driving means that for a certain period of time in a specific situation (for example: driving on an expressway, driving within a parking facility, passing an object, driving within a traffic lane defined by traffic lane markings), a longitudinal guidance and a transverse guidance of the motor vehicle are controlled automatically. A driver of the motor vehicle him/herself does not have to manually control the longitudinal guidance and transverse guidance of the motor vehicle. The driver does not have to continually monitor the automatic control of the longitudinal guidance and transverse guidance in order to be able to manually intervene if needed. If needed, a take-over request is automatically output to the driver for taking control of the longitudinal guidance and transverse guidance, in particular, with a sufficient time reserve. The driver must therefore potentially be able to take control of the longitudinal guidance and the transverse guidance. Limits of the automatic control of the transverse guidance and the longitudinal guidance are automatically recognized. During highly-automated driving, it is not possible to automatically bring about a minimal risk state in every initial situation.

Fully automated driving means that in a specific situation (for example: driving on an expressway, driving within a parking facility, passing an object, driving within a traffic lane defined by traffic lane markings), a longitudinal guidance and transverse guidance of the motor vehicle is controlled automatically. A driver of the motor vehicle him/herself does not have to manually control the longitudinal guidance and transverse guidance of the motor vehicle. The driver does not have to monitor the automatic control of the longitudinal guidance and transverse guidance in order to be able to manually intervene if needed. Prior to a termination of the automatic control of the transverse guidance and longitudinal guidance, a request is automatically made to the driver to assume the driving task (control of the transverse guidance and longitudinal guidance of the motor vehicle), in particular, with a sufficient time reserve. If the driver does not assume the driving task, a return to a minimal risk situation takes place automatically. Limits of the automatic control of the transverse guidance and longitudinal guidance are automatically recognized. In all situations, it is possible to return to a minimal risk system state.

According to one specific example embodiment of the present invention, it is provided that the method according to the first aspect is carried out with the aid of the device according to the second aspect.

Device features result, in particular, from corresponding method features and vice versa. Thus, this means, in particular, that technical functionalities of the device according to the second aspect similarly result from corresponding technical functionalities of the method according to the first aspect and vice versa.

An at least semi-automated driving function according to one specific embodiment of the present invention is an element selected from the following group of at least semi-automated driving functions: congestion assistance function, parking assistance function, lane keeping assistance function, passing assistance function, longitudinal guidance function, transverse guidance function, longitudinal and transverse guidance function.

This may yield, for example, the technical advantage that particularly suitable at least semi-automated driving functions are able to be selected.

According to one specific example embodiment of the present invention, a surroundings sensor in the context of the description is one of the following surroundings sensors: radar sensor, LIDAR sensor, ultrasonic sensor, video sensor, magnetic field sensor, capacitive sensor, temperature sensor, moisture sensor, humidity sensor, audio sensor and infrared sensor.

According to one specific example embodiment of the present invention, it is provided that an application, which is carried out by the component, receives the first and/or the second certificate of the corresponding enclave, for example, the certificate or certificates being supplemented at redundant points in the application with, for example, pieces of application-specific information and/or with a time stamp. These data are provided as output data for checking, for example, in a defined time window, of the enclave or enclaves.

Output data according to one specific example embodiment of the present invention include surroundings data, which represent surroundings of the motor vehicle. Output data according to one specific embodiment include an object list, which indicates objects in the surroundings of the motor vehicle.

The specific example embodiments of the present invention described in the description may each be combined in arbitrary form among one another, even if this is not explicitly described.

BRIEF DESCRIPTION OF THE DRAWINGS

Exemplary embodiments of the present invention are represented in the figures and explained in greater detail in the following description.

FIG. 4 shows a block diagram, according to an example embodiment of the present invention.

DETAILED DESCRIPTION OF EXAMPLE EMBODIMENTS

Figure 1:
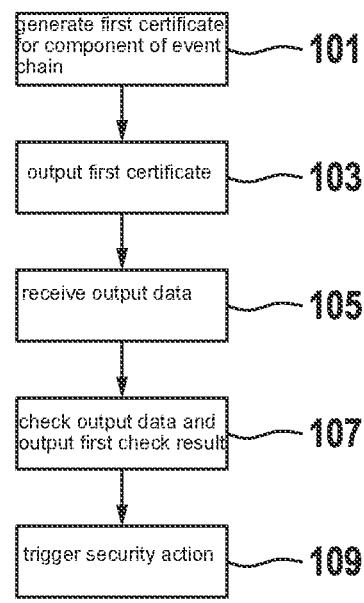
FIG. 1 shows a flowchart of a method for monitoring a component of an event chain for an at least semi-automated driving function of a motor vehicle, according to an example embodiment of the present invention.

In the following, identical reference numerals may be used for identical features.

FIG. 1 shows a flowchart of a method for monitoring a component of an event chain for an at least semi-automated driving function of a motor vehicle using a watchdog, in which an enclave is implemented, including the following steps:

generating 101 a first certificate for the component of the event chain with the aid of the first enclave, outputting 103 the first certificate to the component with the aid of the watchdog, receiving 105 output data output by the component with the aid of the watchdog, checking 107 the output data on the basis of the first certificate with the aid of the first enclave in order to output a first check result, triggering 109 a security action with the aid of the watchdog based on the first check result.

Figure 2:
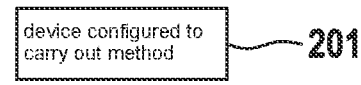
FIG. 2 shows a device, according to an example embodiment of the present invention.

FIG. 2 shows a device 201, which is configured to carry out all steps of the method according to the first aspect.

Figure 3:
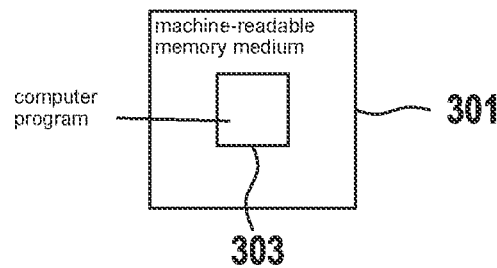
FIG. 3 shows a machine-readable memory, according to an example embodiment of the present invention.

FIG. 3 shows a machine-readable memory medium 301, on which a computer program 303 is stored. Computer program 303 includes commands which, when computer program 303 is executed by a computer, prompt the computer to carry out a method according to the first aspect.

FIG. 4 shows a block diagram 401, which is intended to explain by way of example the concept described herein.

According to block diagram 401, a first surroundings sensor 403 is provided and a second surrounding sensor 405 is provided, each of which detects surroundings of a motor vehicle.

Surroundings data corresponding to the detection are provided to a sensor fusion unit 407. This means, i.e., that sensor fusion unit 407 carries out a sensor fusion of the surroundings sensor data of surroundings sensors 403, 405. A result of this sensor fusion is provided, i.e., conveyed, to an RSU 409.

Thus, an event chain 410 for an at least semi-automated driving function of a motor vehicle is formed.

Event chain 410 includes as components first surroundings sensor 403, second surroundings sensor 405, sensor fusion unit 407 and RSU 409.

A watchdog 411 is provided for monitoring surroundings sensors 403, 405 and sensor fusion unit 407. The watchdog receives both the surroundings sensor data as output data of surroundings sensor 403, 405, as well as a result of sensor fusion unit 407, as further output data.

Watchdog 411 includes a first processing unit 413 and includes a second processing unit 415, which process the received output data of the components of event chain 410. Watchdog 411 further includes a digital map 417 of surroundings of the motor vehicle. The components of the event chain generate, for example, on the basis of the specification of the enclave, pieces of application-specific information, which must be reported back to the enclave in the correct time window.

Digital map 417 is an example of how the surroundings of the motor vehicle may be precisely aligned, for example, by a plausibility check of the surroundings sensors of the motor vehicle and/or infrastructure. The enclave(s) check the uniformity of the two results of a respective analysis of the surroundings data by the two processing units 413, 415 in the correct time window. The results of the respective analyses indicate, for example, that in each case an object has been detected in the surroundings of the motor vehicle. However, first processing unit 413 has detected a first object 423, symbolically represented by an "x" and the second processing unit has detected a second object 425, symbolically represented by an "O." Thus, the two processing units 413, 415 have detected different objects in the same time window. The enclave(s) come(s) to the conclusion that the respective results of the two processing units 413, 415 are different, which the first check result then indicates, so that watchdog 411 triggers a security action.

Watchdog 411 further includes a first enclave 419 and a second enclave 421. Thus, a redundancy advantageously exists with respect to enclaves 419, 421. These may monitor one another, for example, in a reciprocal manner.

It is provided, for example, that the two enclaves 419, 421, as is described above and/or below, generate first and second certificates for the components of event chain 410. For example, corresponding certificates are provided for first surroundings sensor 403, second surroundings sensor 405 and sensor fusion unit 407 and, for example, also for RSU 409. Watchdog 411 outputs these generated certificates to the corresponding components of event chain 410.

The components of event chain 410 receive the corresponding certificates and incorporate these into their nominal function, i.e., in particular, the base function, so that the corresponding output data of the components include, for example, the corresponding received certificate and/or a component certificate, which has been generated using the correspondingly received certificate or the correspondingly received certificates. Correct certificates may, for example, only be generated by the components when the certificate of the enclave has been accepted and is generated by a known reference with a time stamp, etc. by the (external) component. The enclave checks, for example, the accuracy of its own certificate and the timeliness.

Thus, the output data, which are received from the individual components of event chain 410 with the aid of watchdog 411, are able to be efficiently checked by first enclave 419 and by second enclave 421. If in this case, the certificates contained in the output data do not correspond to the format expected by first and second enclave 419, 421, and/or the output data are not received within a predetermined time interval which, for example, may be specific for the respective components of event chain 410, one or multiple security actions, for example, are triggered with the aid of watchdog 411, for example, with the aid of one or of both enclaves 419, 421. A security action is, for example, an element selected from the following group of security actions: rejection of the output data, rejection of an output data flow of the corresponding component, rejection of a data packet including the output data, and rejection of the corresponding components as a source of pieces of information.

In one specific embodiment not shown, it is provided that watchdog 411 includes merely first enclave 419.

In the case of the two redundant enclaves 419, 421, the two enclaves 419, 421 in one specific embodiment may monitor one another in a reciprocal manner and thereby manage, in particular, advantageously also the systematic and also random errors in processing units 413, 415. Furthermore, all memories may be advantageously protected by the redundancy comparison.

The redundant enclave, second enclave 421, increases the availability and also allows the monitoring of the monitoring by the first enclave 411, thus, a strong argument may be made for a double-error protection, which is required according to ASIL D ISO 26262. ASIL stands for "Automotive Safety Integrity Level," which may be translated as "Automotiv Sicherheitsintegritätsniveau."

In enclaves within the context of the description, an MMU ("Memory Management Unit") as described, for example, in the ARINC 653, may according to one specific embodiment be implemented for the functional security. ARINC 653 in the avionics sector refers to the Standard Avionics Application Software Standard Interface created by ARINC. ARINC is an acronym for the firm Aeronautical Radio Incorporated.

From the enclave, it is possible to send a verification key or test vector to all external relevant EE (electrical-electronic) systems which indicate whether the content data are to be recognized or to be monitored for input signals as a result of errors or active threats. The enclaves may also be cyclically activated and deactivated, for example, in order to generate a verification key for external EE systems and, in a further cycle, in order to check the assigned key. For example, the first certificate is a fragment of a key, which is supplemented by a piece of application-specific information by the component from, for example, at least two sources, in order to supplement the key, also referred to as sum key. This sum key checks the enclave.

The security aspects are ensured by the cryptographic protection of the implementable program code in the enclave and by the cryptographic protection of selected data points, which may be statically defined or determined dynamically during the propagation time. These data points are, for example, the points in the event chain where the responses to the enclave certificates (keys) are generated.

In this case, it must be ensured that the trust chain for these selected data is not interrupted at any point in time and that these data are loaded unchanged into the enclave. For this purpose, cryptographic methods are used for protecting the respective data (for example, HMAC). The data in this case are generated in secure surroundings and provided there with the cryptographic security mechanism.

If, in the course of processing, such data must be manipulated by a desired process, this data manipulation then takes place in a secure enclave and a cryptographic protection is again applied in the secure enclave prior to the transfer to the downstream process steps.

If the cryptographic protection is corrupted, it must be assumed that the data are being manipulated in an unauthorized manner. In this way, safety measures may be used to respond directly to safety violations.

In this way, safety-relevant functionalities in uncertain surroundings such as, for example, roadside or in a cloud, may be safely carried out.

The enclave according to the concept described herein checks, in particular, the output data, in particular, with respect to correctness of function and/or point in time, etc., which does not take place in a classical enclave.

What is claimed is:

1. A method for monitoring components of an event chain, the method comprising:
    generating a first certificate for a component of the components of the event chain using a first enclave, wherein the components of the event chain are for an at least semi-automated driving function of a motor vehicle using a watchdog, in which the first enclave is implemented;
    outputting the first certificate to the component using the watchdog;
    receiving output data output by the component using the watchdog;
    checking the output data based on the first certificate using the first enclave to output a first check result, wherein the checking includes checking whether the output data have been received within a predetermined time interval after the outputting of the first certificate, so that the first check result indicates whether the output data have been received within the predetermined time interval after outputting the first certificate; and
    triggering a security action using the watchdog based on the first check result indicating that the output data was received outside the predetermined time interval;
    wherein the components include at least one component of the motor vehicle, and wherein the at least one component includes at least one surroundings sensor.

2. The method as recited in claim 1, wherein the checking includes checking whether the output data include: (i) the first certificate and/or (ii) a component certificate generated using the first certificate, so that the first check result indicates what kind of certificate is contained in the output data, wherein the security action is triggered based on the output data failing to include: (i) the first certificate and/or (ii) the component certificate generated using the first certificate.

3. The method as recited in claim 1, wherein the first certificate is linked to a time specification using the watchdog in order to cryptographically protect the time specification, so that the cryptographically protected time specification is output to the component.

4. The method as recited in claim 1, wherein a second enclave is implemented in the watchdog, the first certificate and the output data being output to the second enclave, so that based on the first certificate, the output data are checked using the second enclave to provide a second check result, the security action being triggered based on the second check result.

5. The method as recited in claim 1, wherein the security action is an element selected from the following group of security actions: rejection of the output data, rejection of an output data flow of at least one of the components, rejection of a data packet including the output data, rejection of the at least one of the components as a source of information.

6. The method as recited in claim 1, wherein the components further include at least one of the following: a sensor, a roadside unit (RSU), an instruction cache unit (ICU), a vehicle control unit (VCU), an actuator, a main control unit, an actuator control unit, a processor, a communication interface, an actuator sensor, a memory medium, a transfer medium, and/or a data processor.

7. The method as recited in claim 1, wherein the components further include a second surroundings sensor, a sensor fusion unit, and a road side unit (RSU).

8. The method as recited in claim 1, wherein the watchdog is for monitoring the surroundings sensor and the sensor fusion unit.

9. The method as recited in claim 1, wherein the watchdog receives surroundings sensor data as output data of the surroundings sensor and the sensor fusion unit.

10. The method as recited in claim 1, wherein the watchdog includes a first processing unit and a second processing unit, both of which process received output data of the components of the event chain.

11. The method as recited in claim 1, wherein the components of the event chain generate, based on a specification of the enclave, application-specific information, which is reported back to the enclave in a correct time window.

12. The method as recited in claim 1, wherein the watchdog includes a digital map of the surroundings of the motor vehicle.

13. The method as recited in claim 12, wherein the digital map allows the surroundings of the motor vehicle to be aligned by a plausibility check of the surroundings sensor of the motor vehicle and/or road infrastructure.

14. The method as recited in claim 13, wherein the enclave checks a uniformity of results of an analysis of the surroundings data by a first processing unit and a second processing unit in a correct time window.

15. An apparatus to monitor components of an event chain, comprising:
    a device configured to perform the following:
        generating a first certificate for a component of the components of the event chain using a first enclave, wherein the components of the event chain are for an at least semi-automated driving function of a motor vehicle using a watchdog, in which the first enclave is implemented;

outputting the first certificate to the component using the watchdog;

receiving output data output by the component using the watchdog;

checking the output data based on the first certificate using the first enclave to output a first check result, wherein the checking includes checking whether the output data have been received within a predetermined time interval after the outputting of the first certificate, so that the first check result indicates whether the output data have been received within the predetermined time interval after outputting the first certificate; and triggering a security action using the watchdog based on the first check result indicating that the output data was received outside the predetermined time interval;

wherein the components include at least one component of the motor vehicle, and wherein the at least one component includes at least one surroundings sensor.

16. A non-transitory machine-readable memory medium, on which is stored a computer program, which is executable by a processor, comprising:

a program code arrangement having program code for monitoring components of an event chain, by performing the following:

generating a first certificate for a component of the components of the event chain using a first enclave, wherein the components of the event chain are for an at least semi-automated driving function of a motor vehicle using a watchdog, in which the first enclave is implemented;

outputting the first certificate to the component using the watchdog;

receiving output data output by the component using the watchdog;

checking the output data based on the first certificate using the first enclave to output a first check result, wherein the checking includes checking whether the output data have been received within a predetermined time interval after the outputting of the first certificate, so that the first check result indicates whether the output data have been received within the predetermined time interval after outputting the first certificate; and triggering a security action using the watchdog based on the first check result indicating that the output data was received outside the predetermined time interval;

wherein the components include at least one component of the motor vehicle, and wherein the at least one component includes at least one surroundings sensor.

\* \* \* \* \*